United States Patent [19]

Egami

[11] Patent Number: 4,703,075
[45] Date of Patent: Oct. 27, 1987

[54] RESINOUS COMPOSITIONS HAVING LUBRICITY

[75] Inventor: Masaki Egami, Yokkaichi, Japan

[73] Assignee: NTN-Rulon Industries Co., Ltd., Tokyo, Japan

[21] Appl. No.: 835,919

[22] Filed: Mar. 4, 1986

[30] Foreign Application Priority Data

Dec. 11, 1985 [JP] Japan ................................ 60-280669
Dec. 11, 1985 [JP] Japan ................................ 60-280670
Dec. 11, 1985 [JP] Japan ................................ 60-280671

[51] Int. Cl.$^4$ .............................................. C08K 5/24
[52] U.S. Cl. .................................................... 524/269
[58] Field of Search ......................................... 524/269

[56] References Cited

U.S. PATENT DOCUMENTS

| 2,558,584 | 6/1951 | Safford | 524/269 |
| 2,644,802 | 7/1953 | Lentz | 524/269 |
| 3,382,196 | 5/1968 | Gowdy et al. | 524/269 |
| 4,020,217 | 4/1977 | Karasudani et al. | 524/269 |
| 4,316,941 | 2/1982 | Eguchi et al. | 428/422 |
| 4,558,082 | 12/1985 | Eckberg | 528/26 |

FOREIGN PATENT DOCUMENTS 59-96151  6/1984  Japan .................................. 524/269

*Primary Examiner*—Joseph L. Schofer
*Assistant Examiner*—N. Sarofim
*Attorney, Agent, or Firm*—Armstrong, Nikaido, Marmelstein & Kubovcik

[57] ABSTRACT

Resinous compositions having lubricity are proposed which are suited for use as bearing parts. The composition comprises a synthetic resin and one or two kinds of organopolysiloxane. Three-dimensional network of organopolysiloxane keeps low the friction coefficient and the abrasion coefficient, reinforces the substrate, and prevents the decrease of mechanical strength of synthetic resin.

4 Claims, No Drawings

RESINOUS COMPOSITIONS HAVING LUBRICITY

The present invention relates to resinous compositions having lubricity.

Recently, the weight of machinery tends to become lighter than before. Reflecting this tendency, a wide variety of parts made of synthetic resin have been put into use as mechanical parts in an increasingly large number. In particular, synthetic resin having excellent lubricating properties is required for use as bearing parts. Conventionally, polyamide, polyacetal, polyethylene, fluorine resin, etc. have been used as synthetic resins having such properties. Generally, these resins function satisfactorily under low-load and low-speed conditions, even with no lubricant. However, in high-load and high-speed operation, they can get seized or flow due to frictional heat, becoming unusable. Fluorine resin, in particular, polytetrafluoroethylene resin exhibits excellent lubricating properties if a filler material is added to improve wear resistance. However, this resin can be molded only by compression molding and its costs are very high. Therefore, attempts of improving the lubricating properties by adding a solid lubricant to other synthetic resins have been made. This method, however, does not sufficiently improve the lubricating properties under high-speed and high-load conditions. Another solution is to add a lubricating oil to synthetic resin to prepare what is called oleoresins. Specifically, this is done by (1) merely mixing a lubricating oil with resin, (2) adding to resin a lubricating oil and a carrier capable of retaining a lubricating oil, (3) adding a fibrous filler material as an oil retaining material. Such oleoresins are designed to generate the lubricating properties by causing the lubricating oil to exude outside. Nevertheless, they have the following problems to solve: (1) friction coefficient does not stabilize at low values, (2) the lubricating oil easily exudes when heated, (3) poor moldability (4) the carrier added tends to scrape off the mating part during friction (5) the lubricating oil is apt to separate from resin during molding or kneading (6) physical properties of the blended materials can decrease (7) lubricating oil easily adheres to the rubbed surface, thus causing dust to build up, and (8) once the lubricating oil has exhausted, the molding is subjected to abnormal wear.

An object of the present invention is to provide a resinous composition which has excellent lubricity and low friction coefficient and low abrasion coefficient.

In accordance with the first embodiment of the present invention, there is provided a resinous composition having lubricity, comprising 100 parts by weight of synthetic resin and 0.5 to 30.0 parts by weight of organopolysiloxane having units each containing a glycidyl radical.

In accordance with the second embodiment of the present invention, there is provided a resinous composition having lubricity, comprising 100 parts by weight of synthetic resin, 0.5 to 20.0 parts by weight of a first organopolysiloxane having units each containing a glycidyl radical, and 0.5 to 20.0 parts by weight of a second organopolysiloxane having units each containing at least one radical selected from the group consisting of amino radical, carboxyl radical, alcoholic hydroxyl radical and mercapto radical.

In accordance with the third embodiment of the present invention, there is provided a resinous composition having lubricity, comprising 100 parts by weight of synthetic resin, 0.5 to 20.0 parts by weight of first organopolysiloxane having units each containing a carboxyl radical, and 0.5 to 20.0 parts by weight of a second organopolysiloxane having units each containing at least one radical selected from the group consisting of a amino radical and alcoholic hydroxyl radical.

Firstly, the term "synthetic resin" as used herein may be either thermosetting or thermoplastic resin, and, although not specifically limited, is intended to include phenol resin, urea resin, melamine resin, melamine/phenol co-condensed resin, xylene-denatured phenol resin, urea/quanamine co-condensed resin, amino resin, acetoguanamine resin, melamine guanamine resin, polyester resin, diallyl phthalate resin, xylene resin, epoxy resin, epoxyacrylate resin, silicone resin, urethane resin, polytetrafluoroethylene, chlorotrifluoroethylene resin, tetrafluoroethylene-hexafluoropropylene copolymer, tetrafluoroethylene-perfluoroalkylvinylether copolymer, fluorinated vinylidene resin, ethylene-tetrafluoroethylene copolymer, ethylene-chlorofluoroethylene copolymer, vinyl chloride resin, vinylidene chloride resin, polyethylene (having low-density, high-density, ultra-high molecular weight), chlorinated polyolefin, polypropylene, denatured polyolefin, moisture-crosslikable polyolefin, ethylene-vinylacetate copolymer, ethylene-ethylacrylate copolymer, polystylene, ABS resin, polyamide, methacrylate resin, polyacetal resin, polycarbonate, cellulosic resin, polyvinyl alcohol, polyurethane elastomer, polyimide, polyether imide, polyamide imide, ionomer resin, polyphenylene oxide, methylpentene polymer, polyallylsulphone, polyallylether, polyether ketone, polyphenylene sulfide, polysulphone, all-aromatic polyester, polyethylene terephthalate, polybuthylene terephthalate, thermoplastic polyester elastomer, and blends of a variety of high-polymer materials.

The organopolysiloxane having units containing glycidyl radical, amino radical, carboxyl radical, alcoholic hydroxyl radical, or mercapto radical may be prepared by adding such radicals into a single polymer or copolymer of organosiloxane such as dimethyl siloxane, methylphenyl siloxane, and trimethylfluoropropyl siloxane. The following are typical examples of organopolysiloxanes:

Organopolysiloxane having units containing a glycidyl radical

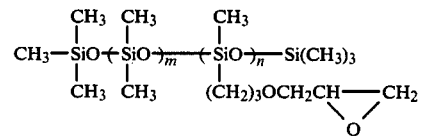

Organopolysiloxane having units containing an amino radical

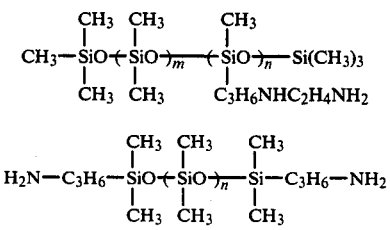

Organopolysiloxane having units containing a carboxyl radical

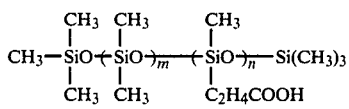

Organopolysiloxane having units containing an alcoholic hydroxyl radical

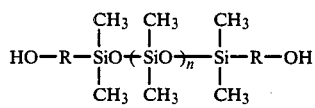

Organopolysiloxane having units containing a mercapto radical

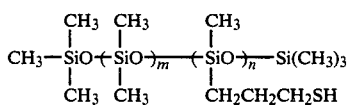

In the first embodiment of the present invention, 0.5 to 30.0 parts by weight, preferably 2.0 to 20.0 parts, of organopolysiloxane having units containing a glycidyl radical should be added to 100 parts by weight of synthetic resin. If the amount is less than 0.5 part, the effect of improving the lubricating properties would be insufficient. If the amount is over 30.0 parts, the mechanical characteristics of synthetic resin, itself would decrease markedly. In addition, in order to accelerate reaction, a catalyst such as amines or acid anhydrides may also be added.

In the second embodiment of the present invention, 0.5 to 20.0 parts by weight, preferably 1.0 to 15.0 parts, of the first organopolysiloxane having units containing a glycidyl radical should be added to 100 parts of synthetic resin. If less than 0.5 part, the effect of improving the lubricating properties would be insufficient. If over 20.0 parts, the mechanical properties of synthetic resin would deteriorate markedly. Also, in the second embodiment, 0.5 to 20.0 parts, preferably 1.0 to 15.0 parts, of the second organopolysiloxane having units containing at least one radical selected from the group consisting of amino radical, carboxyl radical, alcoholic hydroxyl radical and mercapto radical should be added. If less than 0.5 part, the second organopolysiloxane would not react sufficiently with the first organopolysiloxane having units containing a glycidyl radical to retain or bind it in the synthetic resin, so that the composition will exhibit the aforesaid disadvantages of oleoresins. If over 20.0 parts, the mechanical properties of the synthetic resin would deteriorate markedly. The second organopolysiloxane may have units containing two or more radicals selected from the aforesaid group. A catalyst such as an amine may be added to accelerate the reaction.

In the third embodiment of the present invention, 0.5 to 20.0 parts, preferably 1.0 to 15.0 parts, of the first organopolysiloxane having units containing a carboxyl radical should be added in relation to 100 parts of synthetic resin. If less than 0.5 part, the effect of improving the lubricating properties would be insufficient. If over 20.0 parts, the mechanical properties of synthetic resin would deteriorate markedly. Also, 0.5 to 20.0 parts, preferably 1.0 to 15.0 parts, of the second organopolysiloxane having units containing at least one radical selected from the group consisting of amino radical and alcoholic hydroxyl radical should be added. If less than 0.5 part, the second organopolysiloxane would not react sufficiently with the first organopolysiloxane having units containing a carboxyl radical to retain or bind it in synthetic resin, so that the composition would exhibit the aforesaid disadvantages of oleoresins. If over 20.0 parts, the mechanical properties of the synthetic resin would deteriorate markedly. The second organopolysiloxane may contain both amino radical and alcoholic hydroxyl radical so long as the content is within the abovesaid range. A catalyst may be added to accelerate reaction. If the organopolysiloxane containing alcoholic hydroxyl radicals is combined with the first organopolysiloxane containing carboxyl radicals, the latter may be used after the carboxyl radicals therein have been denatured to ester radicals.

The components of the composition according to the present invention may be mixed in a conventionally known manner. For example, synthetic resin and the components may be dissolved separately in a suitable solvent such as fluorochlorohydrocarbon, and then be mixed together by means of a mixer such as a "Henschel" mixer, ball mill, or tumbler mixer, and finally the solvent be removed from the mixture. Then, the mixture is fed to an injection molding machine or a melt extrusion machine having a good melt-mixability, either directly or after having been melt-mixed by means of a hot roller, kneader, or "Banbury" mixer.

In the second and third embodiments of the present invention, the first and second organopolysiloxanes may be mixed separately with synthetic resin, and the two kinds of mixtures thus made in the form of pellets may be mixed at a required ratio directly before molding, and the blend may be fed to an injection molding machine.

The composition according to the present invention may be molded by compression molding, extrusion molding or injection molding. Also, the composition may be melt-mixed, and the mixture be pulverized by means of a jet mill or a refrigerating grinder, and the powder thus obtained may be used for fluidized dip painting or electrostatic spray painting either without or after classifying into a required particle size.

In addition to the organopolysiloxane described above, any additive which can be blended with ordinary synthetic resins may be added in such an amount as not to deteriorate the characteristics of the resinous composition. Such additives include mold-releasing agents, flame retarding agents, weatherability improving agents, etc. Such additives may be added with the organopolysiloxane(s) to synthetic resin. Or, they may be blended beforehand with organopolysiloxane(s) and the mixture be added to synthetic resin.

In addition to those additives, any of the known lubricants such as polytetrafluoroethylene resin powder, graphite, fluorinated graphite, talc, boron nitride, and other industrial lubricants may also be added if required. In addition, any known reinforcing agents such as glass fiber, carbon fiber, alumina fiber, asbestos, rock wool, wollastnite, and potassium titanate whisker, or inorganic filler materials such as glass powder, talc, clay, and calsium carbonate may be added.

The composition of the present invention may be denatured for the improvement of its properties by subjecting the end product or any intermediate product to a chemical or physical treatment, unless such treatment impairs the lubricating properties of the composition.

In the resinous composition of the present invention, a three-dimensional network of organopolysiloxane having lubricity is formed by reaction between the glycidyl radicals in the organopolysiloxane containing glycidyl radicals in the first embodiment, reaction of the glycidyl radicals in the organopolysiloxane containing glycidyl radicals with the functional group in the other organopolysiloxane in the second embodiment, or reaction of the carboxyl radicals in the organopolysiloxane containing carboxyl radicals with the functional group in the other organopolysiloxane in the third embodiment. It is presumed that the three-dimensional networks, finely distributed, serve to maintain the friction coefficient stably at a low level and retain the lubricating substances in the structure without dropping off, and that the networks serve to reinforce the substrate, keep friction low, and prevent the decrease of mechanical strength. Thus, all of the disadvantages of oleoresins are obviated.

The moldings using the resinous composition according to the present invention have not only the mechanical properties inherent to synthetic resin, but also excellent lubricating properties and good moldability. The composition is best suited for use as bearing parts because it satisfies all the requirements of lubrication, moldability and economy.

Described below are the materials used in the Examples and Control Examples in the present invention. Symbols in parentheses indicate the abbreviation for the material.

(1) Polyethylene: "HIZEX 1300J", made by Mitsui Petrochemical Co., Ltd. (PE)

(2) Nylon 12: "DIAMIDE L-1640-P", made by Daicel Co., Ltd. (PA12)

(3) Nylon 66: "AMILAN CM-3001N", made by Toray Industries, Ltd. (PA66)

(4) Polyacetal: "DURACON M-90-02", made by Polyplastics Co., Ltd. (POM)

(5) Polybutylene terephthalate: "NOVADUR 5010", made by Mitsubishi Chemical Industrial Co., Ltd. (PBT)

(6) Polyphenylene sulfide: "RYTON P-4 Powder", made by Phillips Petroleum Co., Inc., U.S.A., (PPS)

(7) Polyetherimide: "ULTEM 1000", made by General Electric Company, U.S.A. (PEI)

(8) Polyimide resin: "POLYAMIDE BISMALAIMIDE C-183", made by Technoschmie GmbH, West Germany (PABM)

(9) Organopolysiloxane containing glycidyl radicals: "Epoxy-denatured SILICONE OIL KF-102", made by Shin-etsu Chemical Industries Co., Ltd.

(10) Non-functional organopolysiloxane: "SILICONE OIL KF-96 3000 cst", made by Shin-etsu Chemical Industries Co., Ltd.

(11) Tertiary amine (N,N-dimethylbenzilamine)

(12) Organopolysiloxane containing amino radicals: Amino-denatured silicone oil KF861, made by Shin-etsu Chebmical Industries Co., Ltd.

(13) Organopolysiloxane containing carboxyl radicals: Carboxyl-denatured silicone oil X-22-3701E, made by Shin-etsu Chemical Industries Co., Ltd.

(14) Organopolysiloxane containing alcoholic hydroxyl radicals: silicone diol X-22-160C, made by Shin-etsu Chemical Industries Co., Ltd.

(15) Organopolysiloxane containing mercapto radicals: mercapto-denatured silicone oil X-22-980, made by Shin-etsu Chemical Industries Co., Ltd.

EXAMPLES 1–20

Firstly, each synthetic resin was blended with the organopolysiloxane containing glycidyl radicals and the tertiary amine with the ratio as shown in Table 1. After being mixed well in a Henschel mixer, the mixture was fed to a double-screw melt extruder in which it was extruded under the melt-mixing conditions shown in Table 2 and was granulated. The pellets obtained were molded by an injection molding machine under the injection molding conditions as shown in Table 2 to prepare ring-shaped test specimens each having an inner diameter of 14 mm, an outer diameter of 23 mm and a length of 13 mm and dumbell-shaped test specimens specified in ASTM-D638 type IV. The friction and abrasion tests were made by use of the ring-shaped test specimens. For the friction test, a thrust type friction tester was used to measure the friction coefficients 1 minute and 60 minutes after starting operation, at a slide speed of 10 meters per minute and under a load of 10 $kg/cm^2$. The abrasion tests were performed by use of a thrust type abrasion tester at a slide speed of 32 meters per minute and under a load of 3.1 $kg/cm^2$. For both of the tests, bearing steel SUJ2 (hardened and ground) was used as the mating part. The dumbell-shaped test specimens were used to measure the tensile strength at a temperature of 23 2 C., a distance between the chucks of 64 mm and a pulling speed of 5 mm per minute. The test results are shown in Table 3.

CONTROL EXAMPLES 1–11

The components were blended at the ratio shown in Table 4 and the test specimens similar to those in Examples 1–20 were prepared under the melt mixing conditions and the molding conditions as shown in Table 5. Those test specimens were tested in the same manner as in Examples 1–20. The test results are shown in Table 6. In the Control Example 4, the molding was not homogeneous due to separation of the components during molding. In any of the Control Examples, the surface of the mating part after sliding moving was sticky.

The measured values shown in Tables 3 and 6 indicate that the required properties are not obtained in the Control Examples. The frictional coefficient and the abrasion coefficient were high in comparison with those in the Examples, in the Control Examples 1, 2 and 5–11. These coefficients were relatively low, but the tensile strength was very low in the Control Example 3. The frictional coefficient was unstable in the Control Example 4. In contrast, in any of the Examples 1–20, both the frictional coefficient and the abrasion coefficient were low and the moldability was good with no decrease in the tensile strength of substrate, that is, synthetic resin. The specimens exhibited no disadvantages inherent to oleoresins. Further, no damage on the mating part during sliding movement was found, because low friction and low abrasion are achieved without adding a hard filler material as conventionally used.

TABLE 1

| | Blending ratio (Wt. part) | | | | |
|---|---|---|---|---|---|
| | Synthetic resin | | Organopolysiloxane containing | | (11) Tertiary |
| Example | Type | Part | Type | part | amine Part |
| 1 | PA12 (2) | 100 | Glycidyl group | 12 | 0 |

TABLE 1-continued

| | Blending ratio (Wt. part) | | | | |
|---|---|---|---|---|---|
| | Synthetic resin | | Organopolysiloxane containing | | (11) Tertiary |
| Example | Type | Part | Type | part | amine Part |
| 2 | " | 100 | " | 12 | 0.3 |
| 3 | " | 100 | " | 4 | 0 |
| 4 | " | 100 | " | 4 | 0.2 |
| 5 | " | 100 | " | 22 | 0 |
| 6 | " | 100 | " | 22 | 1.1 |
| 7 | PE (1) | 100 | " | 12 | 0 |
| 8 | " | 100 | " | 12 | 0.3 |
| 9 | PA66 (3) | 100 | " | 12 | 0 |
| 10 | " | 100 | " | 12 | 0.3 |
| 11 | POM (4) | 100 | " | 12 | 0 |
| 12 | " | 100 | " | 12 | 0.3 |
| 13 | PBT (5) | 100 | " | 12 | 0.3 |
| 14 | " | 100 | " | 12 | 0.3 |
| 15 | PPS (6) | 100 | " | 12 | 0 |
| 16 | " | 100 | " | 12 | 0.3 |
| 17 | PEI (7) | 100 | " | 12 | 0 |
| 18 | " | 100 | " | 12 | 0.3 |
| 19 | PABM (8) | 100 | " | 12 | 0 |
| 20 | " | 100 | " | 12 | 0.3 |

TABLE 2

| | Melt blending condition | | Injection molding condition | | |
|---|---|---|---|---|---|
| Example | cylinder (°C.) | number of screw rotations (rpm) | cylinder (°C.) | Injection pressure (kg/cm²) | mold (°C.) |
| 1 | 190 | 100 | 205 | 1000 | 70 |
| 2 | 190 | 100 | 205 | 1000 | 70 |
| 3 | 190 | 100 | 205 | 1000 | 70 |
| 4 | 190 | 100 | 205 | 1000 | 70 |
| 5 | 190 | 100 | 205 | 1000 | 70 |
| 6 | 190 | 100 | 205 | 1000 | 70 |
| 7 | 180 | 100 | 190 | 500 | 45 |
| 8 | 180 | 100 | 190 | 500 | 45 |
| 9 | 255 | 100 | 265 | 800 | 80 |
| 10 | 255 | 100 | 265 | 800 | 80 |
| 11 | 205 | 100 | 210 | 800 | 80 |
| 12 | 205 | 100 | 210 | 800 | 80 |
| 13 | 245 | 50 | 250 | 800 | 80 |
| 14 | 245 | 50 | 250 | 800 | 80 |
| 15 | 280 | 50 | 315 | 800 | 140 |
| 16 | 280 | 50 | 315 | 800 | 140 |
| 17 | 300 | 100 | 355 | 1350 | 140 |
| 18 | 300 | 100 | 355 | 1350 | 140 |
| 19 | 70 | 30 | 140 | 500 | 220 |
| 20 | 70 | 30 | 140 | 500 | 220 |

TABLE 3

| | Coefficient of friction | | Coefficient of abrasion × $10^{-10}$ cm³/kg · m | Tensile strength kg/cm² |
|---|---|---|---|---|
| Example | After one minute | After sixty minutes | | |
| 1 | 0.24 | 0.26 | 89 | 410 |
| 2 | 0.23 | 0.22 | 67 | 410 |
| 3 | 0.29 | 0.31 | 112 | 415 |
| 4 | 0.27 | 0.28 | 88 | 410 |
| 5 | 0.20 | 0.23 | 65 | 405 |
| 6 | 0.20 | 0.21 | 51 | 410 |
| 7 | 0.19 | 0.20 | 60 | 215 |
| 8 | 0.18 | 0.19 | 50 | 210 |
| 9 | 0.25 | 0.27 | 88 | 780 |
| 10 | 0.23 | 0.23 | 62 | 785 |
| 11 | 0.22 | 0.25 | 105 | 660 |
| 12 | 0.20 | 0.19 | 76 | 655 |
| 13 | 0.22 | 0.23 | 162 | 540 |
| 14 | 0.19 | 0.18 | 132 | 550 |
| 15 | 0.20 | 0.22 | 205 | 610 |
| 16 | 0.20 | 0.21 | 155 | 630 |
| 17 | 0.35 | 0.35 | 2200 | 980 |
| 18 | 0.35 | 0.35 | 2000 | 980 |
| 19 | 0.32 | 0.35 | 210 | — |
| 20 | 0.29 | 0.31 | 205 | — |

TABLE 4

| | Blending ratio (Wt. part) | | | |
|---|---|---|---|---|
| | Synthetic resin | | Organopolysiloxane containing | |
| Control | Type | Part | Type | Part |
| 1 | PA12 (2) | 100 | — | 0 |
| 2 | " | 100 | glycidyl group | 0.1 |
| 3 | " | 100 | " | 35 |
| 4 | " | 100 | Non-functional (10) | 9 |
| 5 | PE (1) | 100 | — | 0 |
| 6 | PA66 (3) | 100 | — | 0 |
| 7 | POM (4) | 100 | — | 0 |
| 8 | PBT (5) | 100 | — | 0 |
| 9 | PPS (6) | 100 | — | 0 |
| 10 | PEI (7) | 100 | — | 0 |
| 11 | PABM (8) | 100 | — | 0 |

TABLE 5

| | Melt blending condition | | Injection molding condition | | |
|---|---|---|---|---|---|
| Control | cylinder (°C.) | number of screw rotations (rpm) | cylinder (°C.) | Injection pressure (kg/cm²) | mold (°C.) |
| 1 | — | — | 205 | 1000 | 70 |
| 2 | 190 | 100 | 205 | 1000 | 70 |
| 3 | 190 | 100 | 205 | 1000 | 70 |
| 4 | 190 | 100 | 205 | 1000 | 70 |
| 5 | — | — | 190 | 500 | 45 |
| 6 | — | — | 265 | 800 | 80 |
| 7 | — | — | 210 | 800 | 80 |
| 8 | — | — | 250 | 800 | 80 |
| 9 | — | — | 315 | 800 | 140 |
| 10 | — | — | 355 | 1350 | 140 |
| 11 | — | — | 140 | 500 | 220 |

TABLE 6

| | Coefficient of friction | | Coefficient of abrasion × $10^{-10}$ cm³/kg · m | Tensile strength kg/cm² |
|---|---|---|---|---|
| Control | After one minute | After sixty minutes | | |
| 1 | 0.64 | 0.62 | 1050 | 430 |
| 2 | 0.44 | 0.43 | 660 | 425 |
| 3 | 0.18 | 0.16 | 195 | 290 |
| 4 | 0.23 | 0.36 | 136 | 385 |
| 5 | 0.23 | 0.22 | 155 | 230 |
| 6 | 0.56 | 0.55 | 140 | 800 |
| 7 | 0.42 | 0.40 | 1100 | 680 |
| 8 | 0.39 | 0.39 | 880 | 580 |
| 9 | 0.48 | 0.46 | 770 | 640 |
| 10 | 0.68 | 0.68 | 23000 | 1010 |
| 11 | 0.81 | 0.78 | 1300 | — |

EXAMPLES 21-38

Two kinds of organopolysiloxanes were blended with a selected synthetic resin at the ratio shown in Table 7. The blends were melt-mixed and molded under the conditions shown in Table 8. The ring-shaped test specimens and the dumbell-shaped ones were prepared in the same manner as in the Examples 1-20. By use of these test specimens, the frictional coefficient, abrasion coefficient and tensile strength were measured in the same manner as in the Examples 1-20. The test results are shown in Table 9.

CONTROL EXAMPLES 12-25

Similar test specimens were prepared at the blending ratio shown in Table 10 and under the melt-mixing conditions and the molding conditions as shown in Table 11. The test specimens thus obtained were tested in the same manner as in the Examples 1-20. The test results are shown in Table 12. In the Control Examples 13, 14, 15 and 18, the moldings were not homogeneous due to separation of the components during molding. In any of the Control Examples, the surface of the mating part after sliding movement was sticky.

The measured values shown in Table 9 for the Examples 21–38 and Table 12 for the Control Examples 12–25 show that the required properties are not obtained in the Control Examples. The frictional coefficient and the abrasion coefficient were relatively low, but the tensile strength was very low in the Control Examples 16 and 18. The frictional coefficient was unstable in the Control Examples 13, 14 and 15. These coefficients were high in comparison with those in the Examples, in the Control Examples 12, 17 and 19–25. In contrast, in any of the Examples 21–38, both the frictional coefficient and the abrasion coefficient were low and the moldability was good with no decrease in the tensile strength of the substrate. None of the specimens exhibited the disadvantages of ordinary oleoresins. Further, no damage no the mating part during sliding movement was found, because low friction and low abrasion are achieved without adding a hard filler material as conventionally used.

TABLE 7

| Example | Synthetic resin (1)~(8) Type | Part | Organopolysiloxane containing glycidyl group (9) Part | Organopolysiloxane containing Type | Part |
|---|---|---|---|---|---|
| 21 | PA12 (2) | 100 | 9 | amino group (12) | 9 |
| 22 | " | 100 | 3 | amino group (12) | 9 |
| 23 | " | 100 | 15 | amino group (12) | 9 |
| 24 | " | 100 | 9 | amino group (12) | 3 |
| 25 | " | 100 | 9 | amino group (12) | 15 |
| 26 | " | 100 | 9 | carboxyl group (13) | 9 |
| 27 | " | 100 | 9 | hydroxyl group (14) | 9 |
| 28 | " | 100 | 9 | mercapto group (15) | 9 |
| 29 | PE (1) | 100 | 9 | amino group (12) | 9 |
| 30 | " | 100 | 9 | carboxyl group (13) | 9 |
| 31 | " | 100 | 9 | hydroxyl group (14) | 9 |
| 32 | " | 100 | 9 | mercapto group (15) | 9 |
| 33 | PA66 (3) | 100 | 9 | mercapto group (15) | 9 |
| 34 | POM (4) | 100 | 9 | mercapto group (15) | 9 |
| 35 | PBT (5) | 100 | 9 | mercapto group (15) | 9 |
| 36 | PPS (6) | 100 | 9 | mercapto group (15) | 9 |
| 37 | PEI (7) | 100 | 9 | mercapto group (15) | 9 |
| 38 | PABM (8) | 100 | 9 | mercapto group (15) | 9 |

TABLE 8

| Example | Melt blending condition cylinder (°C.) | number of screw rotations (rpm) | Injection molding condition cylinder (°C.) | Injection pressure (kg/cm²) | mold (°C.) |
|---|---|---|---|---|---|
| 21 | 190 | 100 | 205 | 1000 | 70 |
| 22 | 190 | 100 | 205 | 1000 | 70 |
| 23 | 190 | 100 | 205 | 1000 | 70 |
| 24 | 190 | 100 | 205 | 1000 | 70 |
| 25 | 190 | 100 | 205 | 1000 | 70 |
| 26 | 190 | 100 | 205 | 1000 | 70 |
| 27 | 190 | 100 | 205 | 1000 | 70 |
| 28 | 190 | 100 | 205 | 1000 | 70 |
| 29 | 180 | 100 | 190 | 500 | 45 |
| 30 | 180 | 100 | 190 | 500 | 45 |
| 31 | 180 | 100 | 190 | 500 | 45 |
| 32 | 180 | 100 | 190 | 500 | 45 |
| 33 | 255 | 100 | 265 | 800 | 70 |
| 34 | 205 | 100 | 210 | 800 | 80 |
| 35 | 245 | 50 | 250 | 800 | 80 |
| 36 | 280 | 50 | 315 | 800 | 140 |
| 37 | 300 | 50 | 355 | 1350 | 140 |
| 38 | 70 | 30 | 140 | 500 | 220 |

TABLE 9

| Example | Coefficient of friction After one minute | After sixty minutes | Coefficient of abrasion × $10^{-10}$ cm³/kg · m | Tensile strength kg/cm² |
|---|---|---|---|---|
| 21 | 0.17 | 0.16 | 28 | 405 |
| 22 | 0.19 | 0.19 | 41 | 405 |
| 23 | 0.15 | 0.15 | 62 | 385 |
| 24 | 0.19 | 0.20 | 44 | 405 |
| 25 | 0.16 | 0.16 | 38 | 400 |
| 26 | 0.15 | 0.16 | 42 | 400 |
| 27 | 0.20 | 0.19 | 33 | 405 |
| 28 | 0.18 | 0.18 | 43 | 400 |
| 29 | 0.11 | 0.11 | 42 | 205 |
| 30 | 0.11 | 0.10 | 40 | 205 |
| 31 | 0.13 | 0.12 | 55 | 200 |
| 32 | 0.12 | 0.11 | 49 | 205 |
| 33 | 0.16 | 0.15 | 48 | 760 |
| 34 | 0.14 | 0.14 | 66 | 620 |
| 35 | 0.16 | 0.17 | 83 | 520 |
| 36 | 0.18 | 0.16 | 145 | 560 |
| 37 | 0.23 | 0.22 | 1400 | 920 |
| 38 | 0.18 | 0.18 | 44 | — |

TABLE 10

| Control | Synthetic resin (1)~(8) Type | Part | Organopolysiloxane containing glycidyl group (9) Part | Organopolysiloxane containing Type | Part |
|---|---|---|---|---|---|
| 12 | PA12 (2) | 100 | 0 | — | 0 |
| 13 | " | 100 | 0 | Non-functional (10) | .9 |
| 14 | " | 100 | 9 | Non-functional (10) | 9 |
| 15 | " | 100 | 0.1 | amino group (12) | 9 |
| 16 | " | 100 | 25 | amino group (12) | 9 |
| 17 | " | 100 | 9 | amino group (12) | 0.1 |
| 18 | " | 100 | 9 | amino group (12) | 25 |
| 19 | PE (1) | 100 | 0 | — | 0 |
| 20 | PA66 (3) | 100 | 0 | — | 0 |
| 21 | POM (4) | 100 | 0 | — | 0 |
| 22 | PBT (5) | 100 | 0 | — | 0 |
| 23 | PPS (6) | 100 | 0 | — | 0 |
| 24 | PEI (7) | 100 | 0 | — | 0 |
| 25 | PABM (8) | 100 | 0 | — | 0 |

TABLE 11

| Control | Melt blending condition | | Injection molding condition | | |
|---|---|---|---|---|---|
| | cylinder (°C.) | number of screw rotations (rpm) | cylinder (°C.) | Injection pressure (kg/cm$^2$) | mold (°C.) |
| 12 | — | — | 205 | 1000 | 70 |
| 13 | 190 | 100 | 205 | 1000 | 70 |
| 14 | 190 | 100 | 205 | 1000 | 70 |
| 15 | 190 | 100 | 205 | 1000 | 70 |
| 16 | 190 | 100 | 205 | 1000 | 70 |
| 17 | 190 | 100 | 205 | 1000 | 70 |
| 18 | 190 | 100 | 205 | 1000 | 70 |
| 19 | — | — | 190 | 500 | 45 |
| 20 | — | — | 265 | 800 | 70 |
| 21 | — | — | 210 | 800 | 80 |
| 22 | — | — | 250 | 800 | 80 |
| 23 | — | — | 315 | 800 | 140 |
| 24 | — | — | 355 | 1350 | 140 |
| 25 | — | — | 140 | 500 | 220 |

TABLE 12

| Control | Coefficient of friction | | Coefficient of abrasion × 10$^{-10}$ cm$^3$/kg · m | Tensile strength kg/cm$^2$ |
|---|---|---|---|---|
| | After one minute | After sixty minutes | | |
| 12 | 0.64 | 0.62 | 1050 | 430 |
| 13 | 0.24 | 0.38 | 160 | 320 |
| 14 | 0.20 | 0.29 | 140 | 340 |
| 15 | 0.26 | 0.33 | 120 | 366 |
| 16 | 0.16 | 0.20 | 210 | 280 |
| 17 | 0.23 | 0.24 | 88 | 410 |
| 18 | 0.17 | 0.23 | 250 | 260 |
| 19 | 0.23 | 0.22 | 155 | 230 |
| 20 | 0.56 | 0.55 | 140 | 800 |
| 21 | 0.42 | 0.40 | 1100 | 680 |
| 22 | 0.39 | 0.39 | 880 | 580 |
| 23 | 0.48 | 0.46 | 770 | 640 |
| 24 | 0.68 | 0.68 | 23000 | 1010 |
| 25 | 0.81 | 0.78 | 1300 | — |

EXAMPLES 39-52

Two kinds of organopolysiloxanes were blended with a selected synthetic resin at the ratio shown in Table 13. The blends were melt-mixed and molded under the conditions shown in Table 14. The ring-shaped test specimens and the dumbell-shaped ones were prepared in the same manner as in the Examples 1-20. By use of these test specimens, the frictional coefficient, abrasion coefficient and tensile strength were measured in the same manner as in the Examples 1-20. The results are shown in Table 15.

CONTROL EXAMPLES 26-39

Similar test specimens were prepared at the blending ratio shown in Table 16 and under the melt-mixing conditions and the molding conditions as shown in Table 17. The test specimens thus obtained were tested in the same manner as in the Examples 1-20. The test results are shown in Table 18. In the Control Examples 27, 28, 29, 31 and 32, the moldings were not homogeneous due to separation of the components during molding. In any of the Control Examples the surface of the mating part after sliding movement was sticky.

The measured values shown in Table 15 for the Examples 39-52 and Table 18 for the Control Examples 26-39 show that the required properties are not obtained in the Control Examples. The frictional coefficient and the abrasion coefficient were relatively low, but the tensile strength was very low in the Control Examples 30 and 32. The friction coefficient was unstable in the Control Examples 27-32. These coefficients were high in comparison with those in the Examples, in the Control Examples 26-39. In contrast, in any of the Examples 39-52, both the frictional coefficient and the abrasion coefficient were low and the moldability was good with no decrease in the tensile strength of substrate. None of the specimens exhibited the disadvantages of ordinary oleoresins. Further, no damage on the mating part during sliding movement was found, because low friction and low wear are achieved without adding a hard filler material as conventionally used.

TABLE 13

| Example | Blending ratio (Wt. part) | | | | |
|---|---|---|---|---|---|
| | Synthetic resin (1)~(8) | | Organopolysiloxane containing carboxyl group (13) | Organopolysiloxane containing | |
| | Type | Part | Part | Type | Part |
| 39 | PA12 (2) | 100 | 9 | amino group (12) | 9 |
| 40 | " | 100 | 3 | amino group (12) | 9 |
| 41 | " | 100 | 15 | amino group (12) | 9 |
| 42 | " | 100 | 9 | amino group (12) | 3 |
| 43 | " | 100 | 9 | amino group (12) | 15 |
| 44 | " | 100 | 9 | hydroxyl group (14) | 9 |
| 45 | PE (1) | 100 | 9 | amino group (12) | 9 |
| 46 | " | 100 | 9 | hydroxyl group (14) | 9 |
| 47 | PA66 (3) | 100 | 9 | amino group (12) | 9 |
| 48 | POM (4) | 100 | 9 | amino group (12) | 9 |
| 49 | PBT (5) | 100 | 9 | amino group (12) | 9 |
| 50 | PPS (6) | 100 | 9 | amino group (12) | 9 |
| 51 | PEI (7) | 100 | 9 | amino group (12) | 9 |
| 52 | PABM (8) | 100 | 9 | amino group (12) | 9 |

TABLE 14

| Example | Melt blending condition | | Injection molding condition | | |
|---|---|---|---|---|---|
| | cylinder (°C.) | number of screw rotations (rpm) | cylinder (°C.) | Injection pressure (kg/cm$^2$) | mold (°C.) |
| 39 | 190 | 100 | 205 | 1000 | 70 |
| 40 | 190 | 100 | 205 | 1000 | 70 |
| 41 | 190 | 100 | 205 | 1000 | 70 |
| 42 | 190 | 100 | 205 | 1000 | 70 |
| 43 | 190 | 100 | 205 | 1000 | 70 |
| 44 | 190 | 100 | 205 | 1000 | 70 |
| 45 | 180 | 100 | 190 | 500 | 45 |
| 46 | 180 | 100 | 190 | 500 | 45 |
| 47 | 255 | 100 | 265 | 800 | 70 |
| 48 | 205 | 100 | 210 | 800 | 80 |
| 49 | 245 | 50 | 250 | 800 | 80 |
| 50 | 280 | 50 | 315 | 800 | 140 |
| 51 | 300 | 100 | 355 | 1350 | 140 |
| 52 | 70 | 30 | 140 | 500 | 220 |

TABLE 15

| Example | Coefficient of friction | | Coefficient of abrasion × 10$^{-10}$ cm$^3$/kg · m | Tensile strength kg/cm$^2$ |
|---|---|---|---|---|
| | After one minute | After sixty minutes | | |
| 39 | 0.18 | 0.17 | 44 | 405 |
| 40 | 0.22 | 0.20 | 62 | 405 |
| 41 | 0.15 | 0.15 | 52 | 385 |
| 42 | 0.20 | 0.20 | 49 | 400 |
| 43 | 0.17 | 0.16 | 42 | 395 |
| 44 | 0.21 | 0.20 | 56 | 405 |

TABLE 15-continued

| Example | Coefficient of friction After one minute | Coefficient of friction After sixty minutes | Coefficient of abrasion × $10^{-10}$ cm³/kg·m | Tensile strength kg/cm² |
|---|---|---|---|---|
| 45 | 0.13 | 0.12 | 45 | 210 |
| 46 | 0.13 | 0.13 | 53 | 205 |
| 47 | 0.15 | 0.15 | 44 | 765 |
| 48 | 0.18 | 0.18 | 77 | 605 |
| 49 | 0.19 | 0.17 | 88 | 515 |
| 50 | 0.18 | 0.18 | 190 | 555 |
| 51 | 0.22 | 0.21 | 1200 | 940 |
| 52 | 0.18 | 0.18 | 46 | — |

TABLE 16

| Control | Synthetic resin (1)~(8) Type | Synthetic resin (1)~(8) Part | Organopolysiloxane containing carboxyl group (13) Part | Organopolysiloxane containing Type | Organopolysiloxane containing Part |
|---|---|---|---|---|---|
| 26 | PA12 (2) | 100 | 0 | — | 0 |
| 27 | " | 100 | 0 | Non-functional (10) | 9 |
| 28 | " | 100 | 9 | Non-functional (10) | 9 |
| 29 | " | 100 | 0.1 | amino group (14) | 9 |
| 30 | " | 100 | 25 | amino group (14) | 9 |
| 31 | " | 100 | 9 | amino group (14) | 9 |
| 32 | " | 100 | 9 | amino group (14) | 25 |
| 33 | PE (1) | 100 | 0 | — | 0 |
| 34 | PA66 (3) | 100 | 0 | — | 0 |
| 35 | POM (4) | 100 | 0 | — | 0 |
| 36 | PBT (5) | 100 | 0 | — | 0 |
| 37 | PPS (6) | 100 | 0 | — | 0 |
| 38 | PEI (7) | 100 | 0 | — | 0 |
| 39 | PABM (8) | 100 | 0 | — | 0 |

TABLE 17

| Control | Melt blending condition cylinder (°C.) | Melt blending condition number of screw rotations (rpm) | Injection molding condition cylinder (°C.) | Injection molding condition Injection pressure (kg/cm²) | Injection molding condition mold (°C.) |
|---|---|---|---|---|---|
| 26 | — | — | 205 | 1000 | 70 |
| 27 | 190 | 100 | 205 | 1000 | 70 |
| 28 | 190 | 100 | 205 | 1000 | 70 |
| 29 | 190 | 100 | 205 | 1000 | 70 |
| 30 | 190 | 100 | 205 | 1000 | 70 |
| 31 | 190 | 100 | 205 | 1000 | 70 |
| 32 | 190 | 100 | 205 | 1000 | 70 |
| 33 | — | — | 190 | 500 | 45 |
| 34 | — | — | 265 | 800 | 70 |
| 35 | — | — | 210 | 800 | 80 |
| 36 | — | — | 250 | 800 | 80 |
| 37 | — | — | 315 | 800 | 140 |
| 38 | — | — | 355 | 1350 | 140 |
| 39 | — | — | 140 | 500 | 220 |

TABLE 18

| Control | Coefficient of friction After one minute | Coefficient of friction After sixty minutes | Coefficient of abrasion × $10^{-10}$ cm³/kg·m | Tensile strength kg/cm² |
|---|---|---|---|---|
| 26 | 0.64 | 0.62 | 1050 | 430 |
| 27 | 0.24 | 0.38 | 160 | 320 |
| 28 | 0.20 | 0.30 | 145 | 340 |
| 29 | 0.25 | 0.34 | 125 | 360 |
| 30 | 0.16 | 0.24 | 205 | 270 |
| 31 | 0.21 | 0.28 | 105 | 390 |
| 32 | 0.16 | 0.25 | 280 | 255 |
| 33 | 0.23 | 0.22 | 155 | 230 |
| 34 | 0.56 | 0.55 | 140 | 800 |
| 35 | 0.42 | 0.40 | 1100 | 680 |
| 36 | 0.39 | 0.39 | 880 | 580 |
| 37 | 0.48 | 0.46 | 770 | 640 |
| 38 | 0.68 | 0.68 | 23000 | 1010 |
| 39 | 0.81 | 0.78 | 1300 | — |

What are claimed are:

1. A resinous composition having lubricity, comprising 100 parts by weight of a synthetic resin, 0.5 to 20.0 parts by weight of a first organopolysiloxane having glycidyl modified units, each of said glycidyl modified units containing a glycidyl radical, and 0.5 to 20.0 parts by weight of a second organopolysiloxane having modified units, each of said modified units containing at least one radical selected from the group consisting of amino radical, carboxyl radical, alcoholic hydroxyl radical and mercapto radical.

2. A resinous composition having lubricity, comprising 100 parts by weight of a synthetic resin, 0.5 to 20.0 parts by weight of a first organopolysiloxane having carboxyl modified units, each of said carboxyl modified units containing a carboxyl radical, and 0.5 to 20.0 parts by weight of a second organopolysiloxane having modified units, each of said modified unit containing at least one radical selected from the group consisting of amino radical and alcoholic hydroxyl radical.

3. The resinous composition of claim 1, comprising 100 parts by weight of the synthetic resin, 1.0 to 15.0 parts by weight of the first organopolysiloxane, and 1.0–15.0 parts by weight of the second organpolysiloxane.

4. A resinous composition as in claim 2, comprising 100 parts by weight of the synthetic resin, 1.0 to 15.0 parts by weight of the first organopolysiloxane, and 1.0 to 15.0 parts by weight of the second organopolysiloxane.

* * * * *